US012810455B2

(12) United States Patent
Lu

(10) Patent No.: US 12,810,455 B2
(45) Date of Patent: Nov. 24, 2026

(54) IMAGE MEASUREMENT SYSTEM FOR BUCKLE OF SNOWBOARD BOOT

(71) Applicant: CHEN KANG CO., LTD., Taichung City (TW)

(72) Inventor: Jia-Yi Lu, Taichung City (TW)

(73) Assignee: CHEN KANG CO., LTD., Taichung City (TW)

( * ) Notice: Subject to any disclaimer, the term of this patent is extended or adjusted under 35 U.S.C. 154(b) by 0 days.

(21) Appl. No.: 19/276,684

(22) Filed: Jul. 22, 2025

(65) Prior Publication Data

US 2026/0360001 A1 Nov. 12, 2026

(30) Foreign Application Priority Data

May 6, 2025 (TW) ................................ 114117016

(51) Int. Cl.
*G06T 7/60* (2017.01)
*H04N 13/221* (2018.01)
*H04N 23/56* (2023.01)

(52) U.S. Cl.
CPC ............ *G06T 7/60* (2013.01); *H04N 13/221* (2018.05); *G06T 2207/10012* (2013.01); *H04N 23/56* (2023.01)

(58) Field of Classification Search
CPC ........ H04N 13/221; H04N 23/56; G06T 7/60; G06T 2207/10012
USPC .......................................................... 348/135
See application file for complete search history.

(56) References Cited

U.S. PATENT DOCUMENTS

| | | | | |
|---|---|---|---|---|
| 6,270,403 | B1 * | 8/2001 | Watanabe | A63F 13/807 463/31 |
| 6,808,196 | B2 * | 10/2004 | Des Ouches | A63C 10/285 280/634 |
| 7,500,393 | B2 * | 3/2009 | Kawai | A63B 69/18 702/139 |
| 10,677,666 | B2 * | 6/2020 | Hollenbacher | A63C 11/04 |
| 2017/0272728 | A1 * | 9/2017 | Rafii | G06Q 30/0631 |

* cited by examiner

*Primary Examiner* — Trang U Tran
(74) *Attorney, Agent, or Firm* — LANWAY IPR SERVICES; Chun-Ming Shih

(57) ABSTRACT

An image measurement system contains: a measuring machine, a surrounding image capture module, a platform, an optical image capture module, and a control interface. The measuring machine includes a measurement space, a lower space, a middle layer, and a passing portion. The platform is aligned with the passing portion. The optical image capture module is electrically connected with the CPU. The surrounding image capture module includes at least one optical circumferential dynamic lens fixed by a support. The control interface is disposed on the measuring machine and electrically connected with the CPU. The CPU includes an image processing module configured to receive and process multiple-angular image data from the optical image capture module and the at least one optical circumferential dynamic lens, thus obtaining 3D reconstruction of the snowboard boot and measuring the size of the snowboard boot.

10 Claims, 10 Drawing Sheets

IMAGE MEASUREMENT SYSTEM FOR BUCKLE OF SNOWBOARD BOOT

TECHNICAL FIELD

The present invention relates to an image measurement system of a buckle of a snowboard boot which is applicable for a construction and a measurement of three dimensional images of a structure and a size of the snowboard boot.

BACKGROUND

As outdoor sports become more popular, skiing activities are becoming more and more popular. The design and manufacturing of ski-related equipment, such as skis, ski boots and bindings, are also evolving. In particular, as an intermediary between skiers and skis, the geometric structure, buckle parts and dimensional accuracy of ski boots have a direct impact on user comfort, control stability and safety.

In addition, most existing systems do not measure and optimize the buckling mechanism of snowboard boots, such as the front buckle and the rear hole, resulting in limited capture angles and loss of detailed information, which in turn affects the final modeling quality and matching accuracy. In addition, the snowboard boot market is increasingly pursuing personalization and precise matching, and users hope to get a better sliding experience through customized design. If there is no high-precision, automated and easy-to-operate measuring device to assist in constructing a three-dimensional data model of snowboard boots, the promotion and application of personalized shoemaking technology will be greatly limited. Thereby, the industry currently urgently needs a three-dimensional image measurement device that can accurately measure the external contour and buckle structure of snowboard boots to make up for the shortcomings of existing technologies and improve the efficiency and accuracy of ski equipment design and manufacturing.

The present invention has arisen to mitigate and/or obviate the afore-described disadvantages.

SUMMARY

The primary aspect of the present invention is to provide an image measurement system of a buckle of a snowboard boot which is applicable for a construction and a measurement of three dimensional images of a structure and a size of the snowboard boot To obtain above-mentioned aspect, an image measurement system of a buckle of a snowboard boot provided by the present invention contains: a measuring machine, a surrounding image capture module, a platform, an optical image capture module, and a control interface.

The measuring machine includes a measurement space defined on a top of the measuring machine, a lower space defined on a bottom of the measuring machine, a middle layer defined between the measurement space and the lower space, and a passing portion formed on the middle layer. The lower space has a central processing unit (CPU).

The platform is fixed in the measurement space, includes a center which aligned with the passing portion, and is configured to hold the snowboard boot.

The optical image capture module is received in the lower space, upward corresponds to the passing portion, and is electrically connected with the CPU, wherein the platform is mounted on a Z axis of the platform by using a rack.

The surrounding image capture module includes at least one optical circumferential dynamic lens fixed and guided by a support to move along an X-axis direction and a Y-axis direction of the platform so as to acquire three dimensional images of the snowboard boot.

The control interface is disposed on a side of the measuring machine and electrically connected with the CPU.

The CPU includes an image processing module configured to receive and process multiple-angular image data from the optical image capture module and the at least one optical circumferential dynamic lens, thus obtaining 3D reconstruction of the snowboard boot and measuring the size of the snowboard boot.

Accordingly, the image measurement system of the present invention quickly completes the three-dimensional measurement and precise recording integration of the buckle area and appearance dimensions of the snowboard boot through the multi-axis movement of the circumferential lens and the bottom-aligned shooting of the central lens, plus the image processing module built into the CPU, thus saving labor costs and providing high application value, quality inspection and personalized snowboard boot.

DETAILED DESCRIPTION

Figure 1:
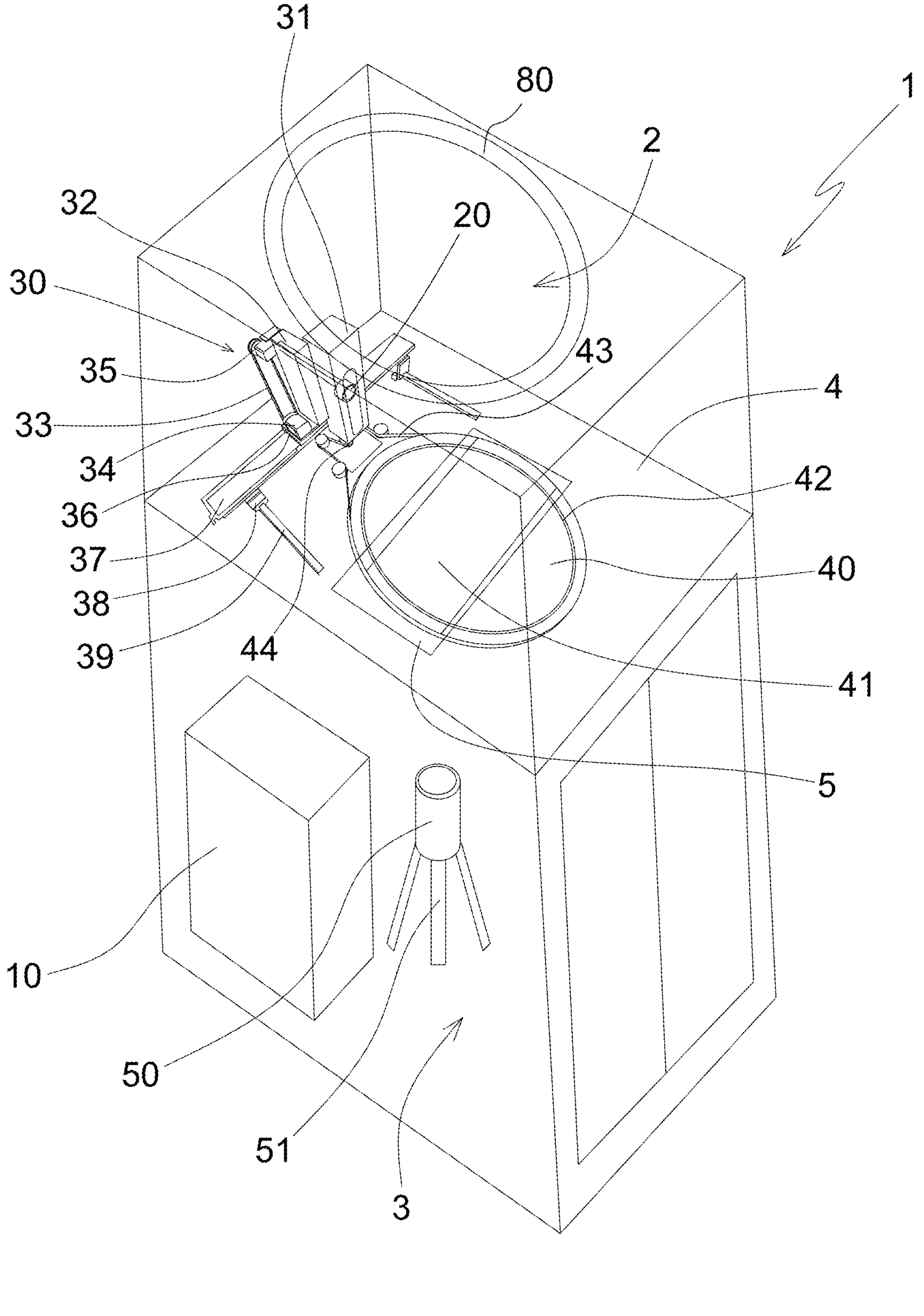
FIG. 1 is a perspective view showing the assembly of an image measurement system of a buckle of a snowboard boot according to a preferred embodiment of the present invention.
Figure 2:
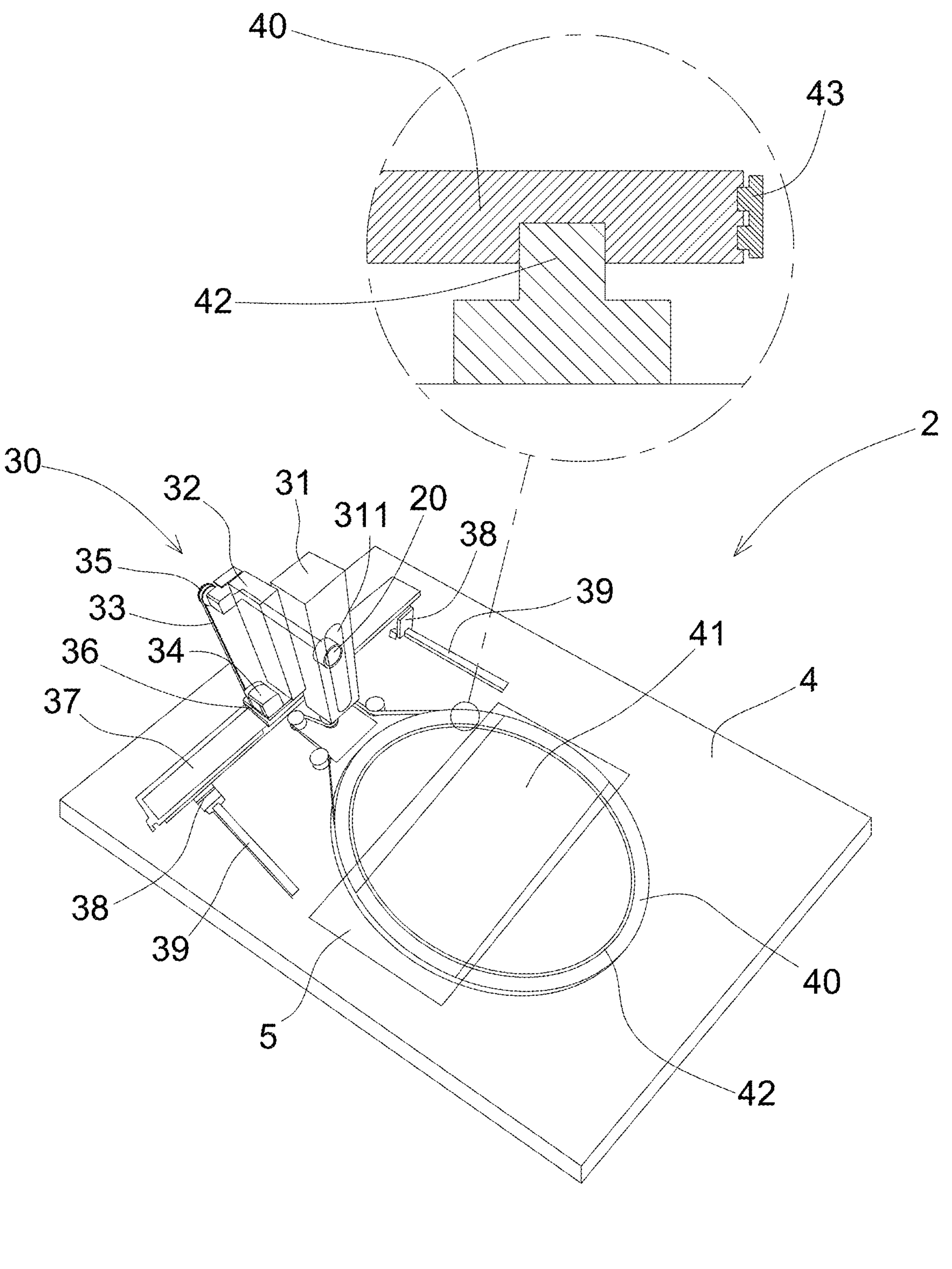
FIG. 2 is a perspective view showing the assembly of a part of the image measurement system of the buckle of the snowboard boot according to the preferred embodiment of the present invention.
Figure 3:
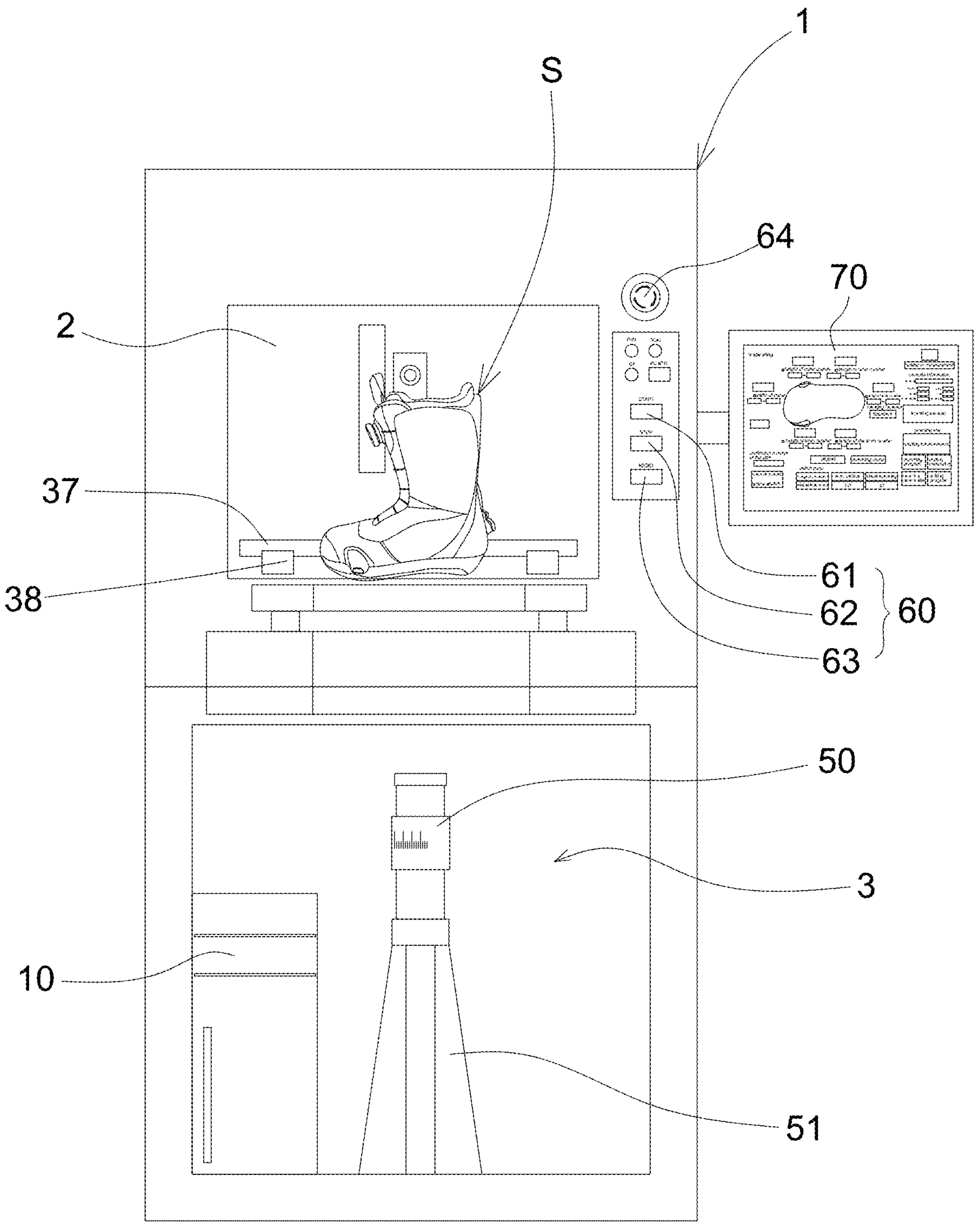
FIG. 3 is a side plan view showing the assembly of the image measurement system of the buckle of the snowboard boot according to the preferred embodiment of the present invention.

With reference to FIGS. 1-10, an image measurement system of a buckle of a snowboard boot according to a preferred embodiment of the present invention is applicable for a construction and a measurement of three dimensional images of a structure and a size of the snowboard boot S.

The image measurement system comprises: a measuring machine 1, a surrounding image capture module 30, a platform 40, an optical image capture module 50, and a control interface 70.

The measuring machine 1 includes a measurement space 2 defined on a top thereof, a lower space 3 defined on a bottom of the measuring machine 1, a middle layer 4 defined between the measurement space 2 and the lower space 3, and a passing portion 5 formed on the middle layer 4 and configured to shoot the snowboard boot by using a camera (not shown), wherein the lower space 3 has a central processing unit 10 (CPU) configured to control the measurement system and to analyze images.

The platform 40 is fixed in the measurement space 2 and is formed in a circular plate, wherein the platform 40 includes a transparent portion 41 made of glasses or acrylic, aligned with the passing portion 5, and being viewable so that the camera shoots the snowboard boot S; the platform 40 includes a circular rail 42 formed on a bottom thereof, a transmission belt 43 surrounding the platform 40 and driven by a drive wheel 44 to rotate, such that the platform 40 rotates along the circular rail 42, thus enhancing multiple-angular image capturing.

The lower space 3 includes the optical image capture module 50 received in the lower space 3, wherein camera lens of the optical image capture module 50 upward correspond to the passing portion 5 and shoots a bottom of the snowboard boot S on the platform 40; wherein the optical image capture module 50 is electrically connected with the CPU 10 and is mounted on a Z axis of the platform 40 by using a rack 51.

The measuring space 2 further the surrounding image capture module 30 which includes at least one optical circumferential dynamic lens 20 fixed by a support 31, and the at least one optical circumferential dynamic lens 20 is guided by the support 31 to move along an X-axis direction and a Y-axis direction of the platform 40; the support 31 accommodates the at least one optical circumferential dynamic lens 20, a rear side of the support 31 is connected with a lifting element 32, wherein the lifting element 32 slides along a longitudinal window 311 of the support 31 and drives the at least one optical circumferential dynamic lens 20 to move upward and downward.

The lifting element 32 includes a transmission motor 34 connected on a top thereof, a driven wheel 35 fixed on a bottom of the lifting element 32, and a moving belt 33 driven by the transmission belt 34 and the driven wheel 35, such that the at least one optical circumferential dynamic lens 20 moves upward and downward; the lifting element 32 also includes a saddle 36 disposed on a bottom thereof, a holder 37 mounted below the saddle 36, two sliders 38 connected on two ends of a bottom of the holder 37 and on two slidable rails 39, such that the at least one optical circumferential dynamic lens 20 moves upward, downward, horizontally, forward, and rearward.

The control interface 70 is disposed on a side of the measuring machine 1 and is configured to display the images and be operated, the control interface 70 includes multiple buttons 60 which are a start key 61, a stop key 62, a re-start key 63, and a shutdown key 64, such that the user operates the image measurement system by using the control interface 70.

The CPU 10 includes an image processing module 90 configured to receive and process multiple-angular image data from the optical image capture module 50 and the at least one optical circumferential dynamic lens 2, thus obtaining 3D reconstruction of the snowboard boot and measuring the size of the snowboard boot precisely.

In a measuring process, the snowboard boot S is placed on the platform 40, wherein the snowboard boot S has a first locking portion S1 on a side of a front end of the snowboard boot S, a second locking portion S3 on the other side of the front end of the snowboard boot S, a boring portion S2 defined on a rear end of the snowboard boot S, a hanging fastener S4 alternatively mounted or not mounted with the boring portion S2.

Figure 4:
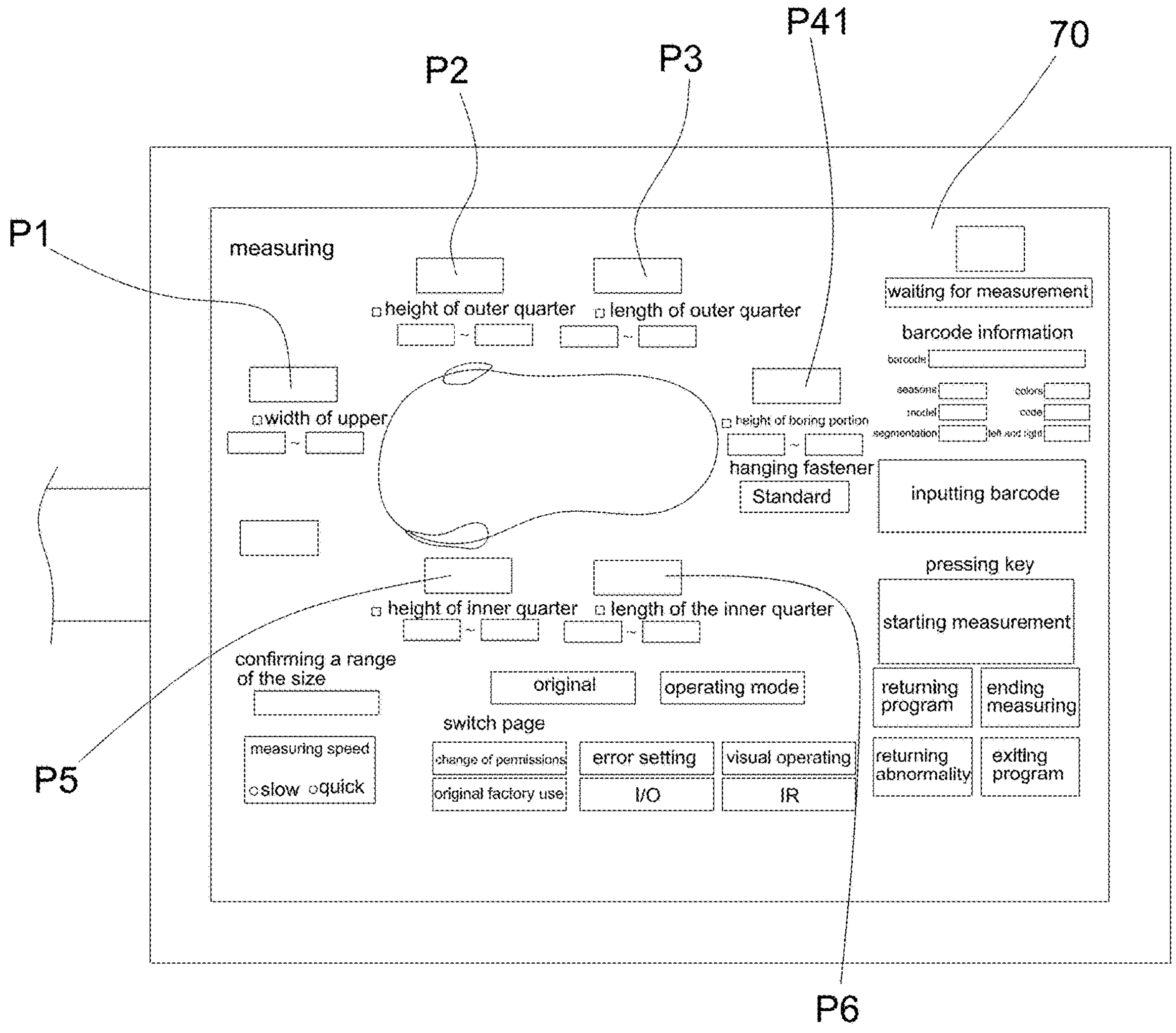
FIG. 4 is a side plan view showing the assembly of a part of the image measurement system of the buckle of the snowboard boot according to the preferred embodiment of the present invention.
Figure 5:
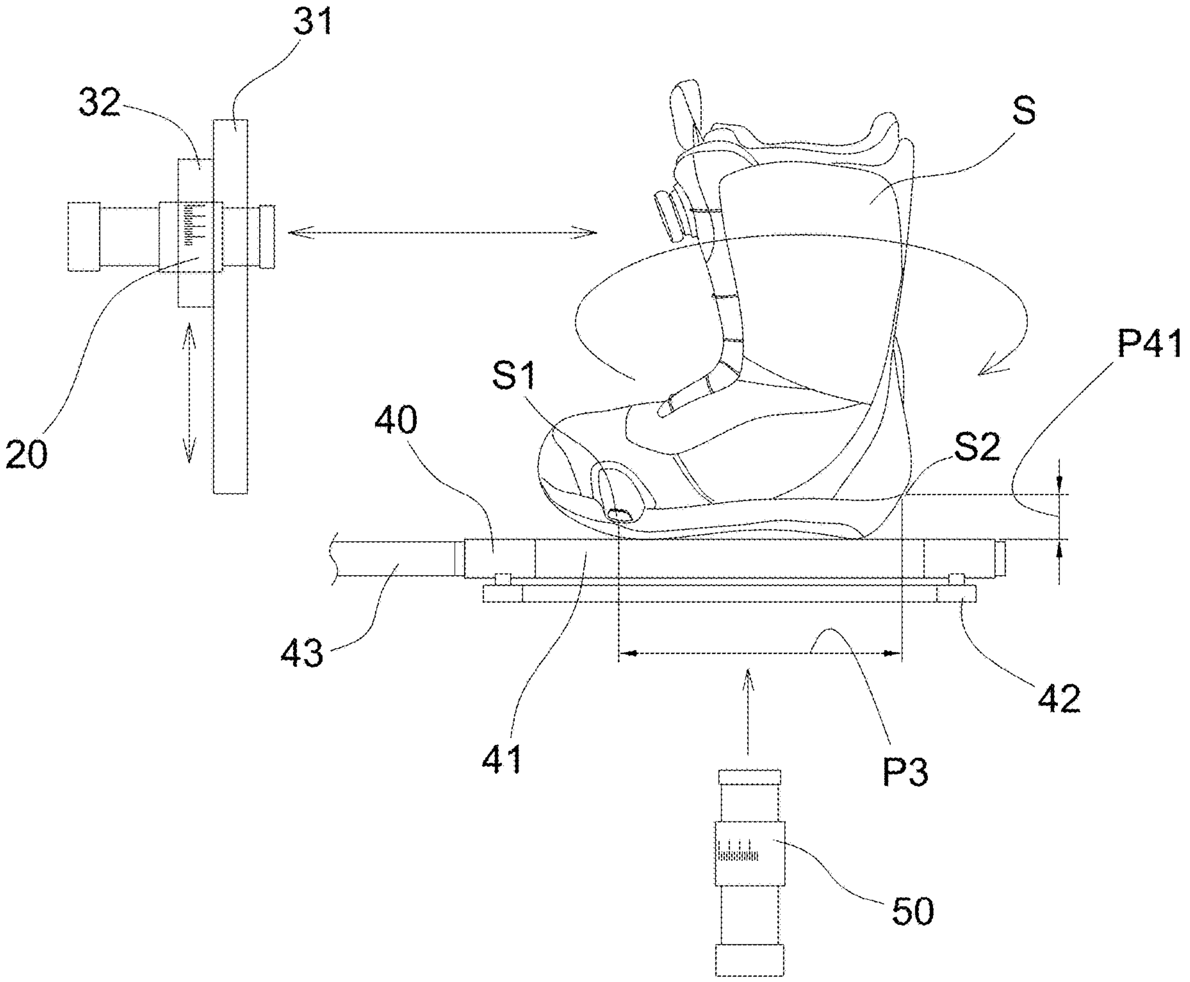
FIG. 5 is a side plan view showing the operation of the image measurement system of the buckle of the snowboard boot according to the preferred embodiment of the present invention.
Figure 6:
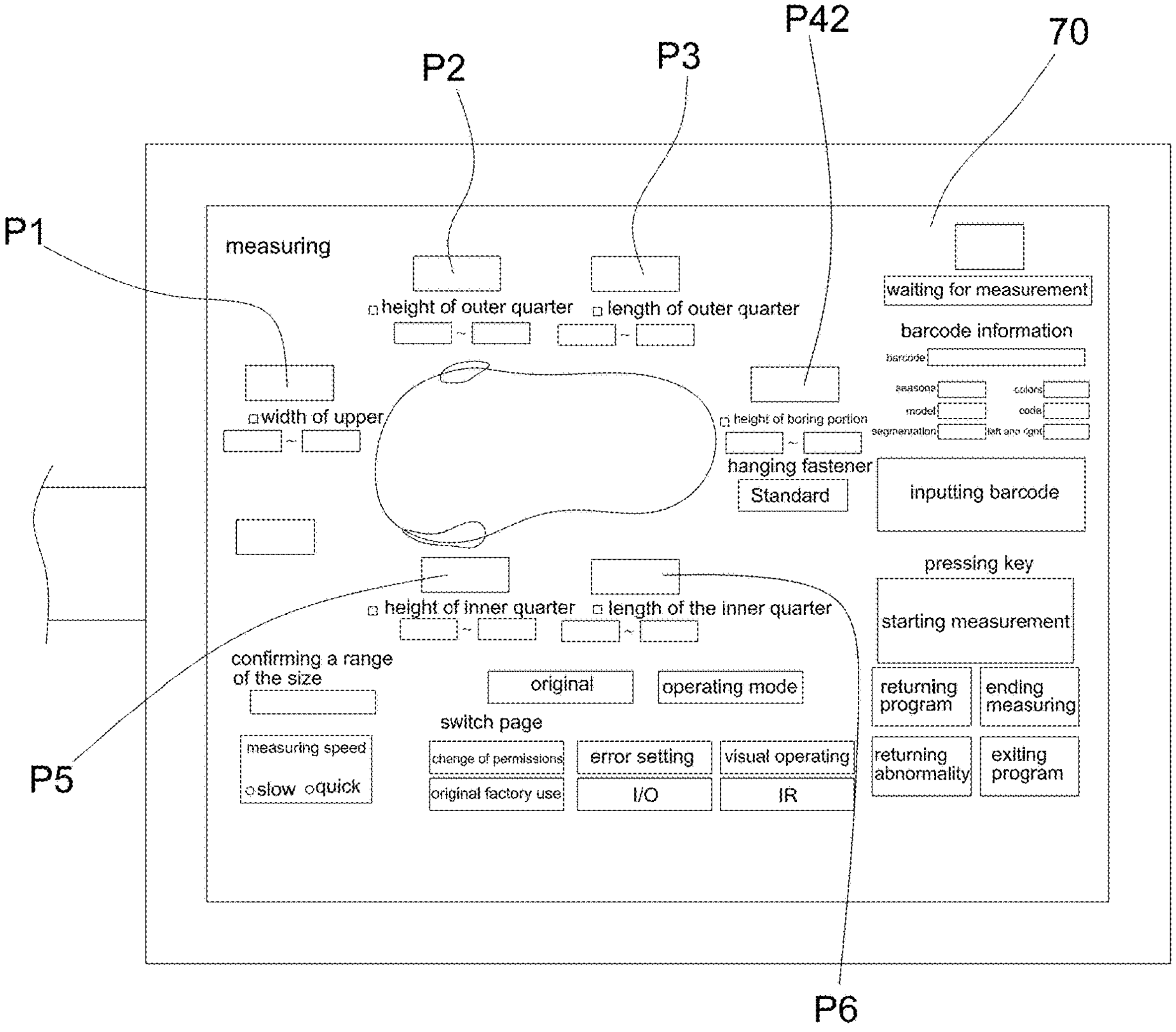
FIG. 6 is another side plan view showing the assembly of a part of the image measurement system of the buckle of the snowboard boot according to the preferred embodiment of the present invention
Figure 7:
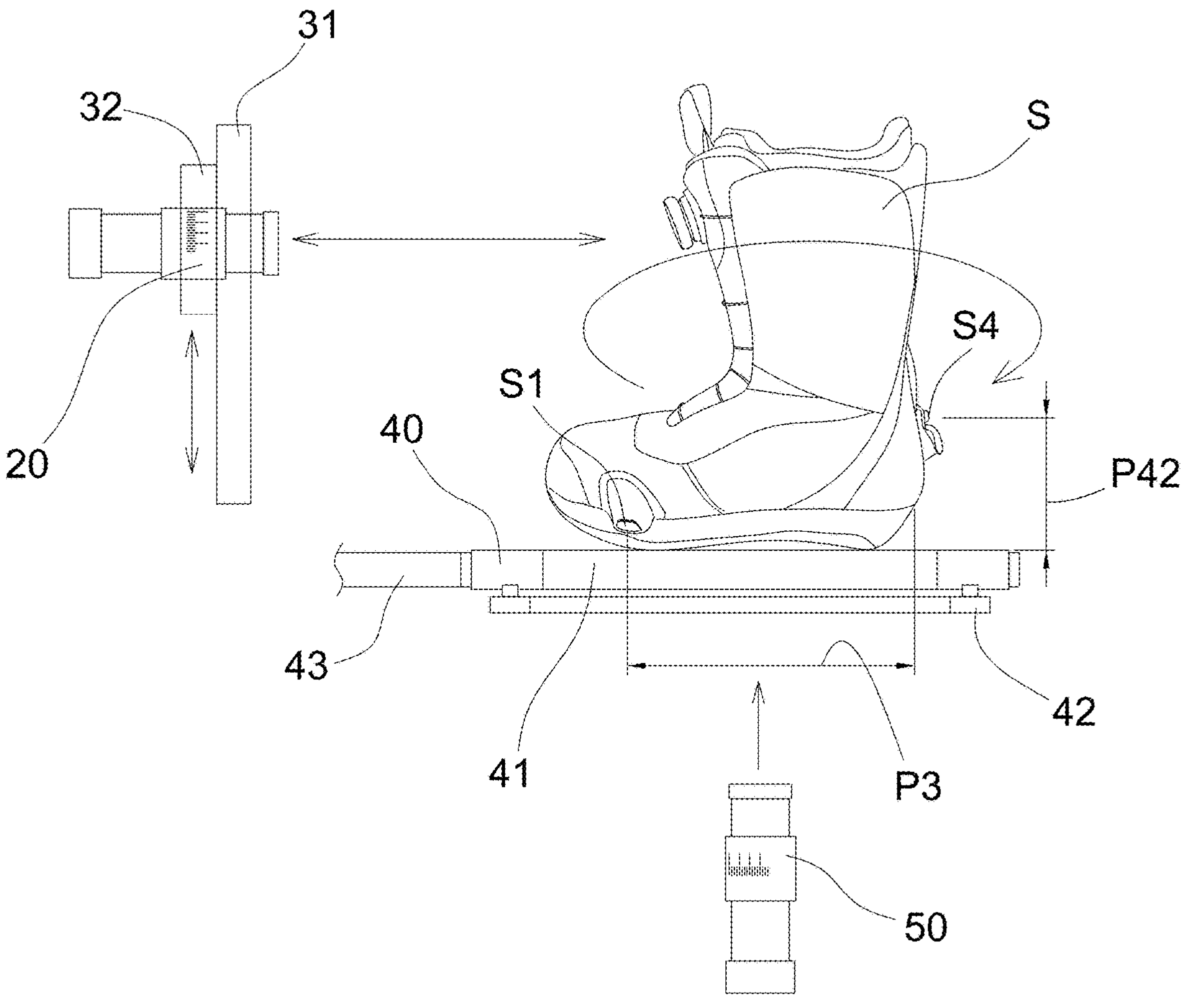
FIG. 7 is another side plan view showing the operation of the image measurement system of the buckle of the snowboard boot according to the preferred embodiment of the present invention.
Figure 8:
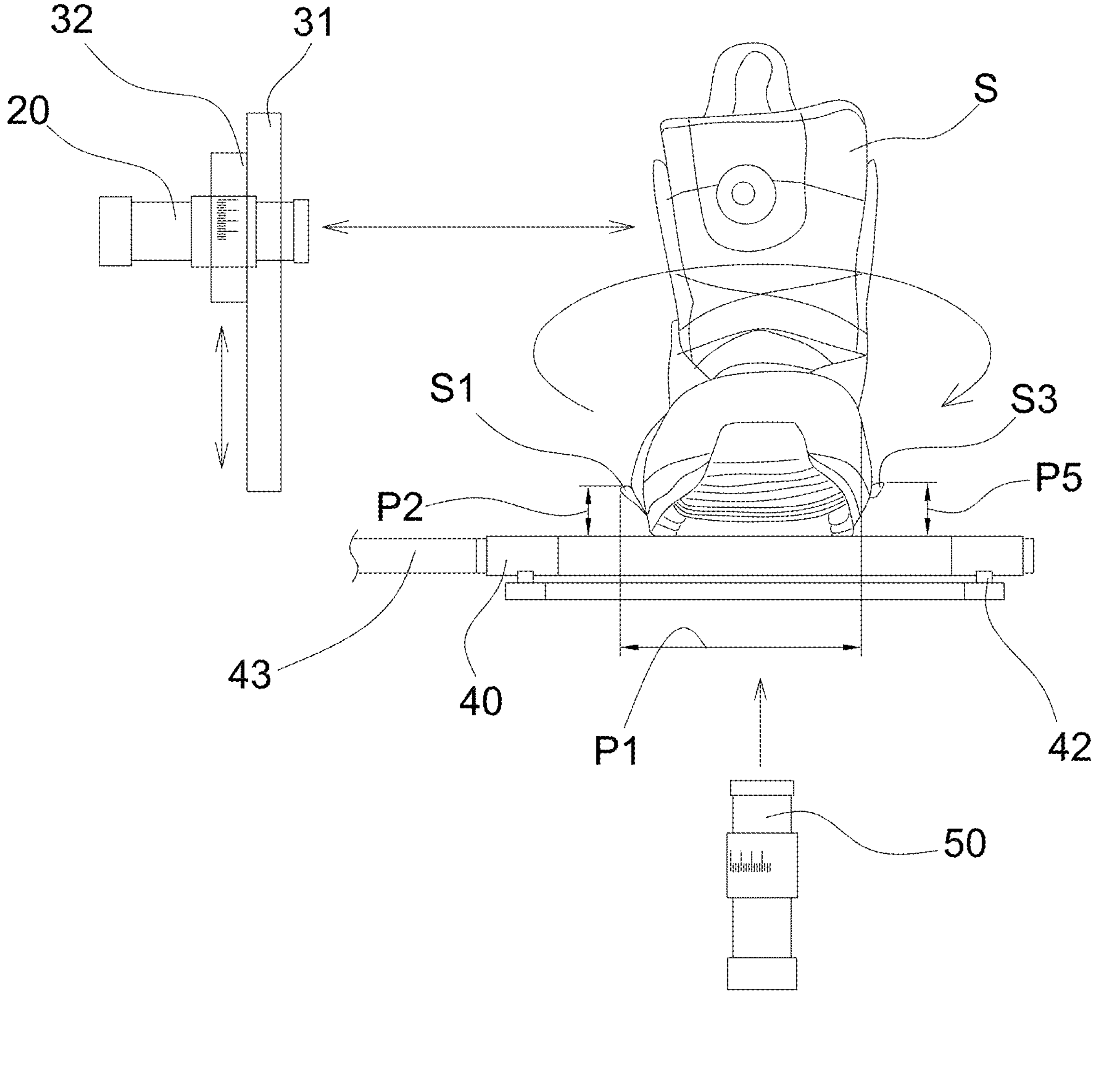
FIG. 8 is also another side plan view showing the operation of the image measurement system of the buckle of the snowboard boot according to the preferred embodiment of the present invention.
Figure 9:
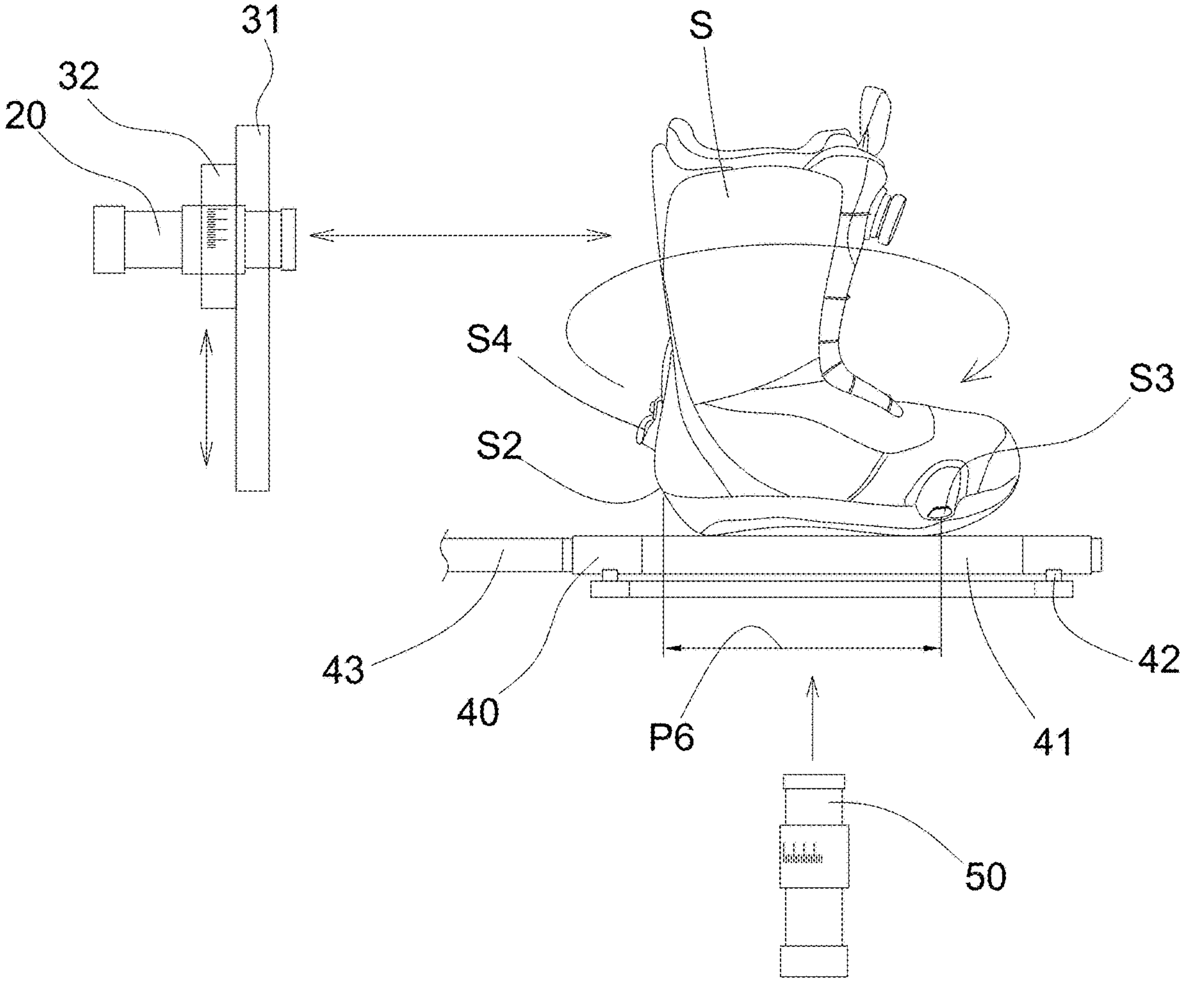
FIG. 9 is still another side plan view showing the operation of the image measurement system of the buckle of the snowboard boot according to the preferred embodiment of the present invention.
Figure 10:
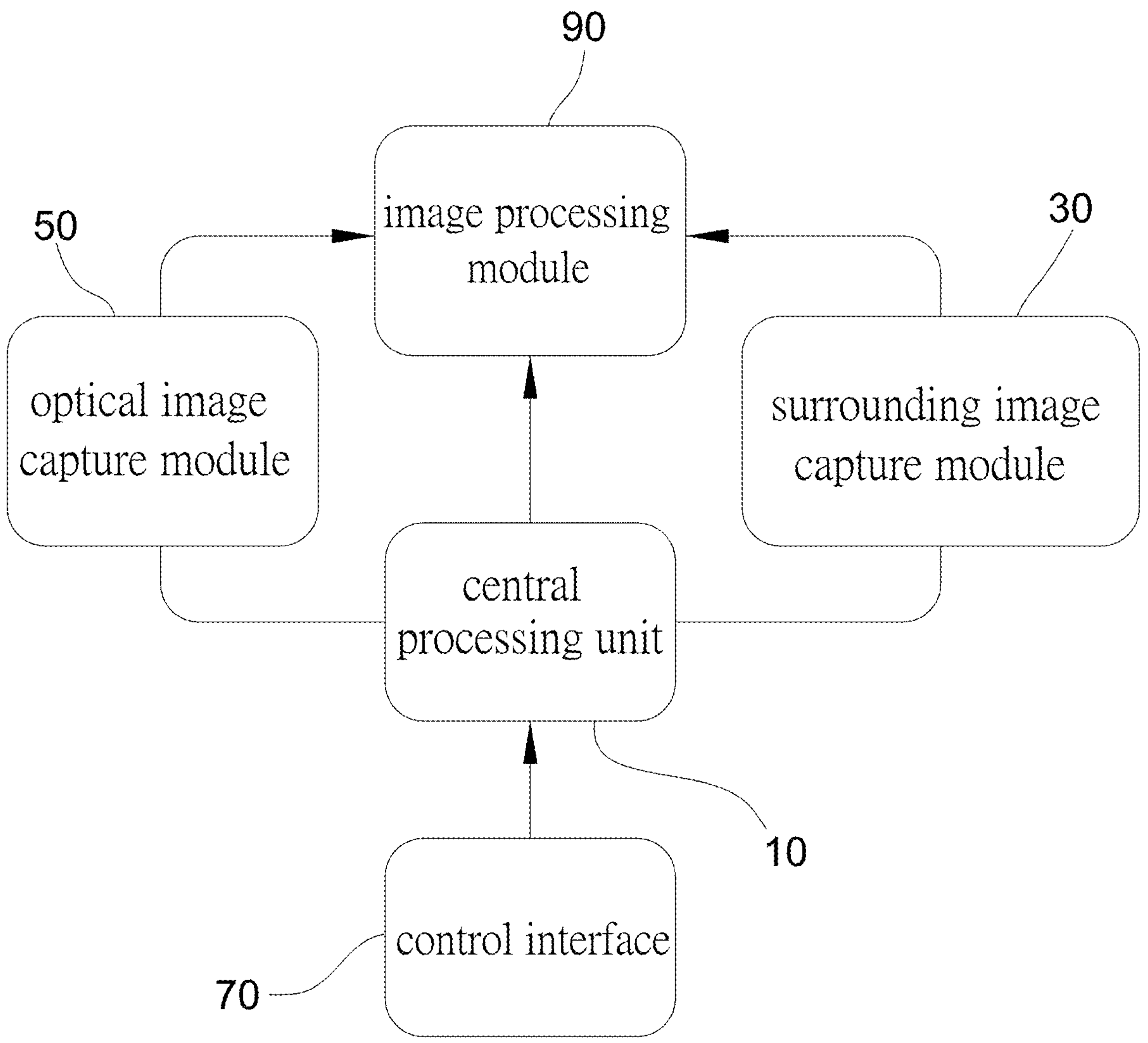
FIG. 10 is a block diagram showing the assembly of the image measurement system of the buckle of the snowboard boot according to the preferred embodiment of the present invention.

Referring to FIGS. 4-5, the boring portion S2 is not mounted with the hanging fastener S4 and is measured. As shown in FIGS. 6-7, the boring portion S2 is mounted on the hanging fastener S4 and is measured; as illustrated in FIGS. 5-9, the CPU 10 is configured to analyze parameters of the size of the snowboard boot as follows:

a width P1 of an upper from the first locking portion S1 to a peripheral side of the upper of the snowboard boot;

a height P2 of an outer quarter which is a vertical distance from the first locking portion S1 to a ground;

a length P3 of the outer quarter which is a horizontal distance from the first locking portion S1 to the boring portion S2;

a height P41 of the boring portion S2 which is a vertical distance from the boring portion S2 to the ground;

a height P5 of an inner quarter which is a distance from a second locking portion S3 to the ground;

a length P6 of the inner quarter which is a distance from the second locking portion S3 to the boring portion S2; and a height P42 of the hanging fastener S4 which is a vertical distance from the hanging fastener S4 to the ground.

Thereafter, the CPU 10 automatically displays the above-mentioned parameters in a size column of the control interface 70, as shown in FIG. 4.

To enhance a quality of the images, the measurement space 2 has an adjustable ring light 80 to provide a uniform and adjustable lighting environment, thus assisting the image capture module in performing high-quality scanning at all angles.

The CPU 10 is an industrial control host with GPU computing capabilities (such as NVIDIA Jetson Orin or Intel Core i7+RTX series graphics card) to support real-time image computing and 3D modeling.

An image sensing element used in the optical image capture module 50 and the at least one optical circumferential dynamic lens 20 is a complementary metal-oxide-semiconductor (CMOS) element with a resolution of not less than 12 million pixels and has low-light performance and a high-speed shutter to reduce motion blur.

The control interface 70 is a touch-screen industrial tablet and installs a dedicated user interface program (GUI) to display the images, models, and measurement results.

Software and algorithm implementation: Using multi-lens time synchronization tools such as OpenCV, combined with an image embedded time code (timestamp) and a trigger signal (trigger signal) to ensure lens synchronization capture. For calibration, lens distortion parameters are corrected through Zhang's method.

Image stitching and model reconstruction: SIFT/SURF and other feature point matching technologies are used for multi-view image matching. SfM (Structure from Motion) and MVS (Multi-view Stereo) algorithms are used to construct dense point clouds. If an active structured light projection device is used, Gray-code and phase-shift technologies can be used to improve modeling accuracy.

Size recognition and calculation: Using deep learning models (such as Mask R-CNN) to perform semantic segmentation of a shape and a buckle area of the snowboard boot S. Using 3D point cloud coordinate calculations (such as PCL Point Cloud Library) to calculate the vertical and horizontal distances between each geometric segment, thus obtaining various size parameters (P1 to P6, P41, P42).

Accordingly, the image measurement system of the present invention quickly completes the three-dimensional measurement and precise recording integration of the buckle area and appearance dimensions of the snowboard boot S through the multi-axis movement of the circumferential lens and the bottom-aligned shooting of the central lens, plus the image processing module 90 built into the CPU 10, thus saving labor costs and providing high application value, quality inspection and personalized snowboard boot.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. An image measurement system of a buckle of a snowboard boot comprising:

an measuring machine including a measurement space defined on a top of the measuring machine, a lower space defined on a bottom of the measuring machine, a middle layer defined between the measurement space and the lower space, and a passing portion formed on the middle layer, wherein the lower space has a central processing unit (CPU);

a platform fixed in the measurement space, including a center which aligned with the passing portion, and configured to hold the snowboard boot;

an optical image capture module received in the lower space, upward corresponding to the passing portion, and electrically connected with the CPU, wherein the platform is mounted on a Z axis of the platform by using a rack;

a surrounding image capture module including at least one optical circumferential dynamic lens fixed and guided by a support to move along an X-axis direction and a Y-axis direction of the platform so as to acquire three dimensional images of the snowboard boot;

a control interface disposed on a side of the measuring machine and electrically connected with the CPU;

wherein the CPU includes an image processing module configured to receive and process multiple-angular image data from the optical image capture module and the at least one optical circumferential dynamic lens, thus obtaining 3D reconstruction of the snowboard boot and measuring the size of the snowboard boot.

2. The image measurement system as claimed in claim 1, wherein a rear side of the support is connected with a lifting element, the lifting element slides along a longitudinal window of the support and drives the at least one optical circumferential dynamic lens to move upward and downward; the lifting element includes a transmission motor connected on a top thereof, a driven wheel fixed on a bottom of the lifting element, and a moving belt driven by a transmission belt and the driven wheel, such that the at least one optical circumferential dynamic lens moves upward and downward; the lifting element also includes a saddle disposed on a bottom thereof, a holder mounted below the saddle, two sliders connected on two ends of a bottom of the holder and on two slidable rails, such that the at least one optical circumferential dynamic lens moves upward, downward, horizontally, forward, and rearward.

3. The image measurement system as claimed in claim 1, wherein the platform is formed in a circular plate, and the platform includes a transparent portion and corresponds to the optical image capture module.

4. The image measurement system as claimed in claim 1, wherein the platform includes a transmission belt surrounding the platform and driven by a drive wheel to rotate, and such that the platform rotates along the circular rail.

5. The image measurement system as claimed in claim 3, wherein the platform includes a transmission belt surrounding the platform and driven by a drive wheel to rotate, and such that the platform rotates along the circular rail.

6. The image measurement system as claimed in claim 1, wherein the measuring machine includes multiple buttons which are a start key, a stop key, a re-start key, and a shutdown key.

7. The image measurement system as claimed in claim 1, wherein the control interface displays parameters of a size of the snowboard boot, and the parameters includes:

a width of an upper, a height of an outer quarter, a length of the outer quarter, a height of the boring portion, a height of an inner quarter, a length of the inner quarter, and a height of the hanging fastener.

8. The image measurement system as claimed in claim 7, wherein the width of an upper is from the first locking portion to a peripheral side of the upper of the snowboard boot;

the height of the outer quarter is a vertical distance from the first locking portion to a ground;

the length of the outer quarter which is a horizontal distance from the first locking portion to the boring portion;

a height of the boring portion is a vertical distance from the boring portion to the ground;

the height of the inner quarter is a distance from a second locking portion to the ground;

the length of the inner quarter is a distance from the second locking portion to the boring portion; and the height of the hanging fastener is a vertical distance from the hanging fastener to the ground.

9. The image measurement system as claimed in claim 1, wherein the at least one optical circumferential dynamic lens moves upward, downward, horizontally, forward, and rearward.

10. The image measurement system as claimed in claim 1, wherein the measurement space has an adjustable ring light to provide a uniform and adjustable lighting environment.

* * * * *